United States Patent [19]
Schaffer

[11] 3,834,559
[45] Sept. 10, 1974

[54] ARTICLE HANDLING APPARATUS
[75] Inventor: Donald W. Schaffer, Lakewood, Colo.
[73] Assignee: International Business Machines Corporation, Armonk, N.Y.
[22] Filed: Oct. 23, 1973
[21] Appl. No.: 408,716

Related U.S. Application Data
[63] Continuation-in-part of Ser. No. 304,698, Nov. 8, 1972.

[52] U.S. Cl............. 214/1 BT, 214/730, 294/65.5, 214/16.4 A
[51] Int. Cl............................ B25j 3/00, B66c 1/00
[58] Field of Search............ 214/730, 731, 650–654, 214/1 BT; 294/65.5

[56] References Cited
UNITED STATES PATENTS
3,087,629  4/1963  Sharpe ............................. 214/1 BT
3,124,260  3/1964  Tidball ............................. 214/1 BT
3,411,640  11/1968  Wallis .............................. 214/1 BT
3,504,808  4/1970  Carabateas ..................... 214/16.4 A FOREIGN PATENTS OR APPLICATIONS
958,539  5/1964  Great Britain ..................... 294/65.5
1,196,641  7/1970  Great Britain ..................... 294/65.5

Primary Examiner—Robert J. Spar
Assistant Examiner—R. B. Johnson
Attorney, Agent, or Firm—Herbert F. Somermeyer

[57] ABSTRACT

A dual storage wall automatic storage and retrieval apparatus preferably for article storage includes a novel, pivotable, article storage and retrieving device for enabling the orientation of the articles in the storage compartments to remain the same. The article handling mechanism can exchange articles at the ends of the storage arrays. Resilient and spaced-apart guiding fingers facilitate article exchange between a carriage and storage compartment.

5 Claims, 6 Drawing Figures

ARTICLE HANDLING APPARATUS

REFERENCE TO PRIOR APPLICATION

This application is a continuation-in-part of copending application Ser. No. 304,698, filed Nov. 8, 1972, "Article Storage and Retrieval."

DOCUMENTS INCORPORATED BY REFERENCE

Burke et al, U.S. Pat. Nos. 2,941,738 and 2,941,739.

Beach et al, U.S. Pat. No. 3,584,284.
Rinkleib U.S. Pat. No. 3,631,971.
Badum et al, U.S. Pat. No. 3,627,225.
Laman U.S. Pat. No. 3,749,993.

BACKGROUND OF THE INVENTION

The invention relates to article handling apparatus and more particularly to such apparatus useful for handling document-containing articles.

The general arrangement of the Burke et al patents, supra, shows storage apparatus requiring that a document-containing article (a two-spool magnetic tape cartridge) be maintained the same with respect to the carriage. However, it has been found that transferring document-containing articles by electromagnetic means increases the tolerances for successful rapid storage and retrieval of the articles to and from storage compartments. The Rinkleib patent, supra, describes such a document-containing article. To use the Rinkleib articles in a storage apparatus such as in Badum et al and Burke et al, it is desired to have the magnetic disk always facing the travel path when stored in a storage wall. When the article is processed through the wall to an article receiving station for document processing, this orientation must always be the same with respect to such a processor. Therefore, in order to be able to have a facing dual-wall storage apparatus as shown in Burke et al, either two article storage and fetching devices are employed on a single carriage or elevator of the mechanism must be pivotable. Because of positioning a carriage over long distances, cumulative tolerances must be accommodated. In accordance with the present invention, such tolerances are accommodated with simple effective apparatus.

SUMMARY OF THE INVENTION

It is an object of the invention to provide a low-cost, facile, fast-operating, wide tolerance in fetching and storing apparatus for use in a storage apparatus.

In a preferred form, the invention is used in an information document storage apparatus having two spaced-apart parallel-extending storage walls, each wall having a plurality of open and facing storage compartments. A main carriage carrying an elevator system movably disposed between the facing storage compartment walls selectively accesses any of the storage compartments. Additionally, document processing means are preferably provided for selectively receiving document-containing articles in the same manner as the storage compartment receives same. The elevator system has two-dimensional movements along a given defined plane between said walls. A frame on the elevator has a horizontal platform. A bed is pivotably disposed on the platform for selective pivoting motions transverse to the defined plane. The elevator further has suitable control means connected to said pivoting bed for establishing plural stable pivoted positions. The first of the stable positions includes a front end portion of the pivoting bed being adjacent a first of said storage walls for facilitating exchange of document-containing articles with a selected storage compartment. A second of said stable positions includes such first end portion being adjacent the second one of said storage walls for enabling exchanges of document-containing articles with storage compartments in such wall.

In accordance with the invention, a reciprocating article carriage is disposed in the pivoting bed and includes wide tolerance document or article retaining means. The article carriage is reciprocable between a traveling position which is central of the pivoting bed and a load/unload position wherein the carriage is disposed over the front end portion of the pivoting bed. A pair of vertically spaced-apart resilient fingers constitutes an article retainer. The fingers are preferably bifurcated with facing curved article steering surfaces. Electromagnetic article grasping is preferred for enhancing tolerances.

The foregoing and other objects, features, and advantages of the invention will become apparent from the following more particular description of the preferred embodiment as illustrated in the accompanying drawing.

THE DRAWING

DETAILED DESCRIPTION

Like numbers indicate like parts and structural features in the various views and diagrams. The terms "article" and "cartridge" are used interchangeably.

Figure 1:
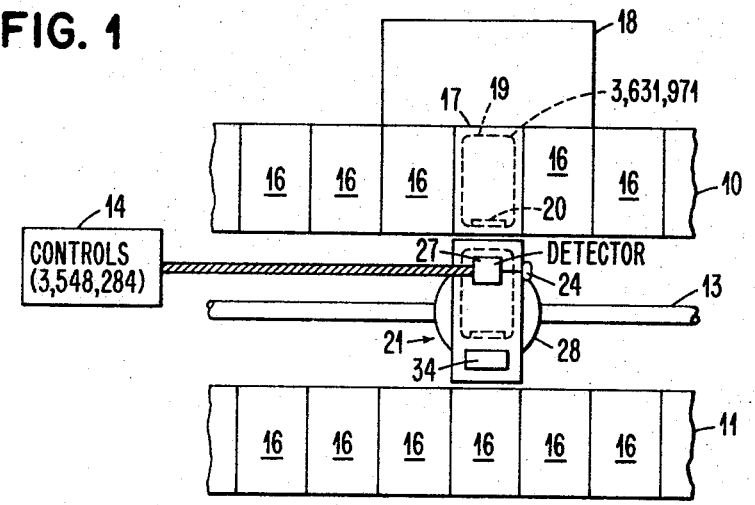
FIG. 1 is a simplified diagrammatic showing of a data processing system in which the present invention can be advantageously practiced.

FIG. 1 is a simplified plan view of a dual wall tape storage article and retrieval system constructed in accordance with Burke et al, U.S. Pat. No. 2,941,738. A pair of facing open-sided storage walls 10 and 11 has an XY carriage 21 movable therebetween along track 13. A set of controls 14, which may include the apparatus shown in U.S. Pat. No. Beach et al, 3,584,284, controls XY carriage 12. Each storage wall 10 and 11 has a plurality of storage compartments 16 arranged in a rectangular array such as shown in the Burke et al, patent, supra. Additionally, one or more input/output ports 17 extend through the array between storage compartment 16 from an article processing station 18, which may be a tape drive as shown in Burke et al, supra, and the open side of storage wall 10. Port 17 may be replaced by other cartridge transfer devices, such as an array of compartments pluggable into one of the storage walls 10 or 11. The tape volumes or tape cartridges usable with the present invention are preferably of the type shown in U.S. Pat. No. Rinkleib 3,631,971, or suitable modifications thereof. That is, it is preferred that the media cartridge be relatively small, for example, roughly two inches square and three inches long. Such media, when recorded, exhibits a small or limited external magnetic field enabling sensing or recorded signals, as is well known.

Figure 4:
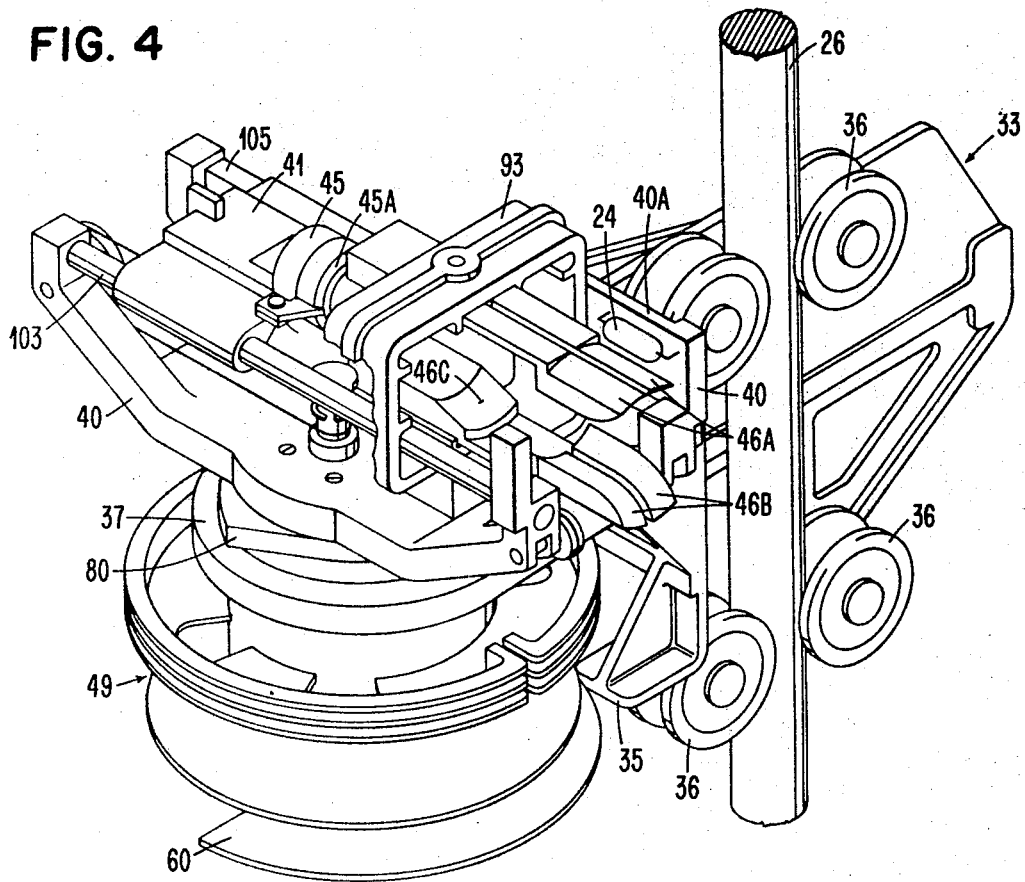
FIG. 4 is a second diagrammatic perspective view of pivoting article handler more clearly showing article retaining fingers.
Figure 2:
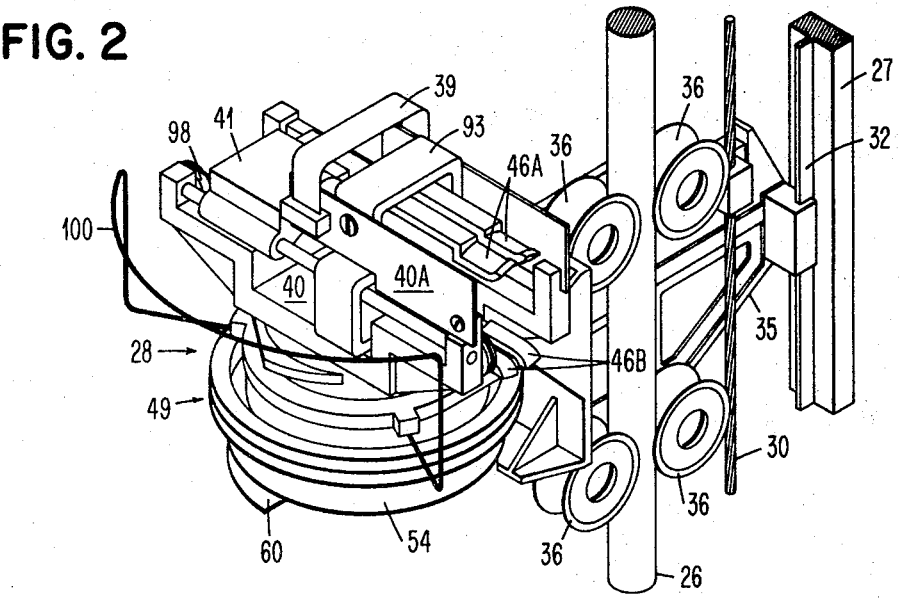
FIG. 2 is a first simplified diagrammatic perspective view of article storage and retrieval apparatus incorporating the present invention.
Figure 5:
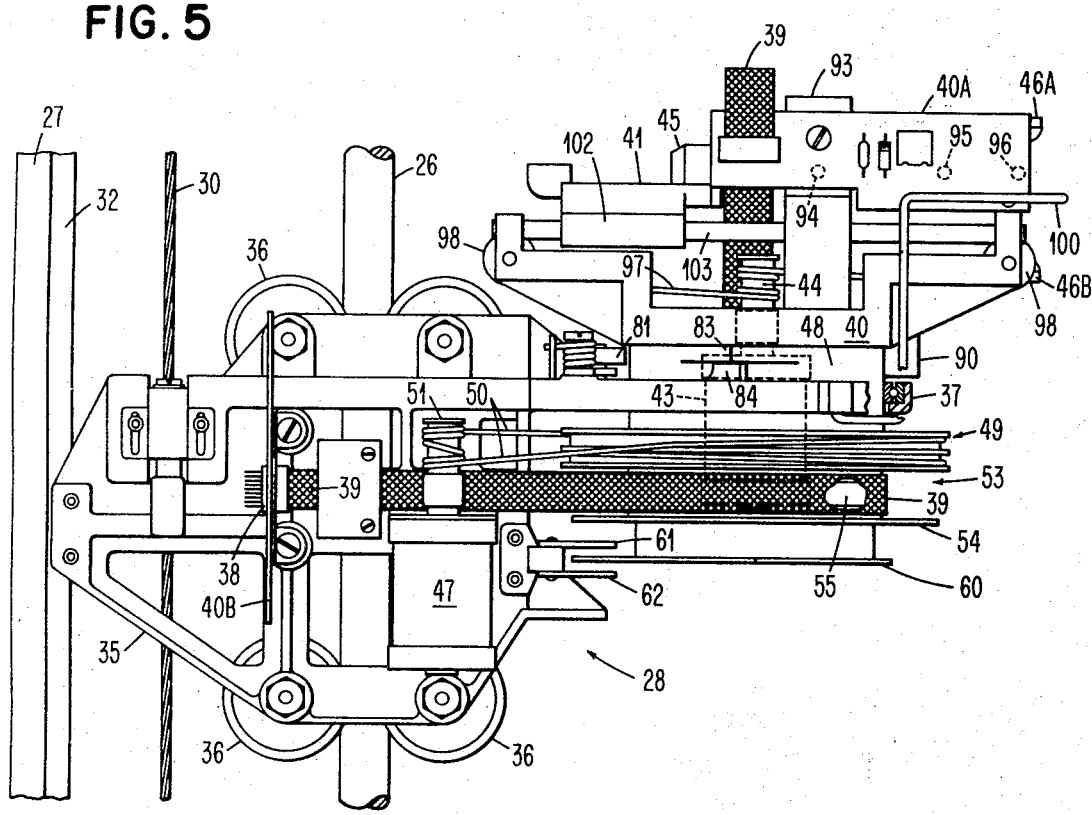
FIG. 5 is a simplified diagrammatic side elevational view of the FIG. 2 illustrated apparatus with selected cutaways to show internal constructional features.
Figure 6:
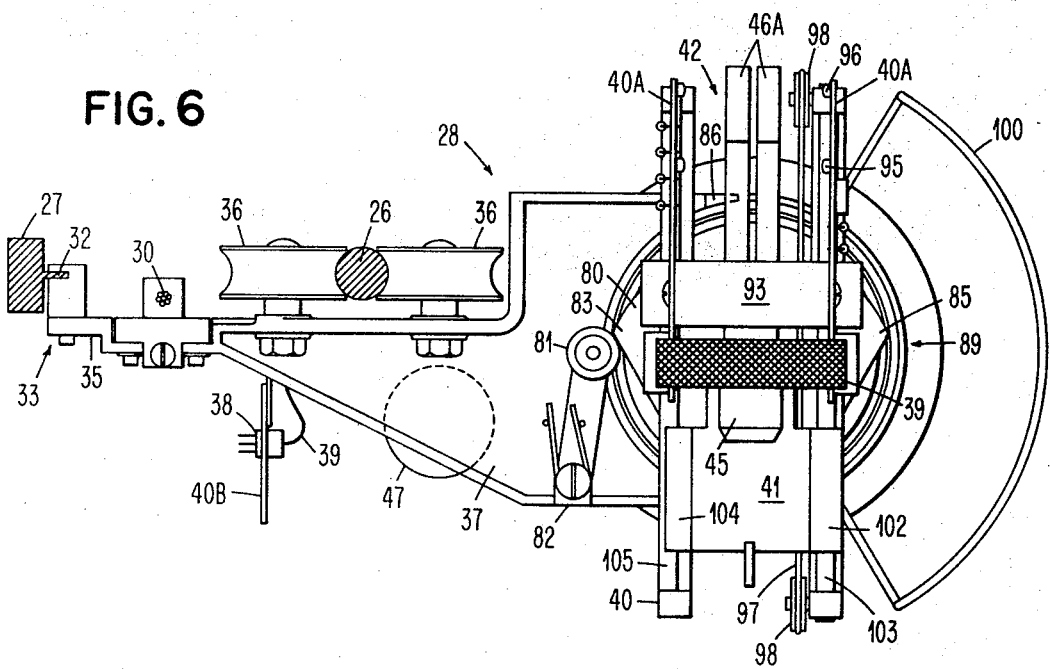
FIG. 6 is a simplified diagrammatic plan view of the FIG. 2 illustrated apparatus.

In one system, electromagnetic selection of a cartridge 19 from the I/O port 17 or any of the compartments 16 uses a magnetizable or magnetic disk 20 disposed at one end of the cartridge and an electromagnet as shown in the Laman patent, supra, FIGS. 4 and 5.

Each cartridge 19 in storage compartments 16 has a magnetic disk 20 facing toward track 13. Accordingly, XY carriage 21 has accessing mechanism or elevator 28 to access or store cartridges 19 with magnetic disk 20 facing toward track 13. This means the orientation of the cartridge in wall 10 is opposite to the orientation of the cartridge in wall 11. Accordingly, mechanism 28 includes rotary bed 40 for swiveling with the cartridge for accessing either wall 10 or 11.

A sensing element such as magnetic reed switch 24 is suitably mounted upon elevator 28. Mechanism 21 fetches cartridge 19 from I/O port 17 or equivalents or any of the storage compartment 16 and places it on carriage 21 for transport to another location such as described in Beach et al, U.S. Pat. No. 3,584,284. Upon a cartridge being completely inserted in elevator 28, magnetic reed switch 24 senses the external magnetic field of the cartridge 19 to be transported. If the magnetic field exceeds the threshold determined by the characteristics of magnetic reed switch 24, the switch opens an electrical circuit under influence of the external magnetic field to stop operations as described by Laman, supra.

Carriage 21 has upstanding elevator post 26 spaced from upstanding guide post 27. The two posts are spaced apart for precisely guiding elevator 28 along a vertical path. Upper rail 29 is engaged by the upper end portion of posts 26 and 27 for ensuring precise vertical alignment. Elevator 28 is powered vertically by a motor within main carriage 25 through a cable system including cable 30. Precise location of elevator 28 is indicated by the positioning system described in Beach et al, supra. Upstanding elevator post 26 is preferably circular for maintaining the precise alignment of elevator 28 between the facing walls as the post wears from extended usage.

Guide post 27 has a forwardly extending tooth 32 which rides in a mating groove at the rearward end portion 33 of elevator 28. The elevators in carriages 13 and 14 are preferably arranged with the respective elevator posts 26 facing each other with guide posts 27 closer to the respective ends of storage walls 10 and 11.

Each elevator 28 includes cast frame 35 rotatably supporting four spaced-apart circumferentially grooved rollers 36. The adjustment of these rollers provides precise horizontal alignment of platform 37 integrally formed on frame 35. Rotation of elevator 28 about post 26 is prevented by the abovedescribed guide post engagement with rear portion 33. In addition to drive cable 30 moving elevator 28 along a vertical travel path, a flexible signal and power cable extends from main carriage 21 to elevator 28. This flexible cable is connected to junction board 38 which in turn supplies power through flexible cable 39 to one of the circuit boards 40A as will be later more fully appreciated.

An annular ball bearing (FIG. 5) assembly precisely supports bed 40 on stationary horizontal platform 37 for pivoting about a vertical axis. Reciprocating or article carriage 41 is movably disposed on bed 40 for reciprocating motion between a travel position central of the pivoting bed and a load/unload position wherein the carriage is disposed over the front end portion of pivoting bed 40 such as at 42.

The operation of the device is as follows. Elevator 28 is appropriately vertically positioned, while the main carriage assumes its selected horizontal position. To fetch a document-containing article, pivotable bed 40 is pivoted to stable position 1. Upon reaching stable position 1 as indicated by sensors later described, carriage motor 43 via carriage driving capstan 44 moves reciprocating carriage 41 forwardly (toward a storage wall 10 or 11). At the start of the forward stroke, electromagnet 45 is energized for later attaching the article to be loaded to the electromagnet; see Laman, supra. A pair of annular concentric pole faces 45A supply an annular fringing magnetic field facing a cartridge to be carried. The field penetrates a disk on the cartridge holding it to electromagnet 45. Reciprocating carriage 41 then returns to the travel position with the article being carried by electromagnet 45 between flexible and resilient article retaining fingers 46A and 46B. Electromagnet 45 may remain energized during main carriage travel. Electromagnet 45 is preferably gimballed for limited motions about its reciprocating article travel path between fingers 46A and 46B which extend outwardly of platform 40.

A key part of the inventive apparatus resides in resilient paired fingers 46A and 46B. It is preferred that these fingers be of molded plastic material. The outer ends of these fingers are arcuately outwardly tapered for guiding an incoming cartridge into a nesting position against arcuate stop 46C, one such stop on each pair of fingers 46A and 46B. As shown, fingers 46A and 46B receive a cylindrical cartridge (not shown) rather than the Rinkleib illustrated rectangular cartridge. Such a cartridge can be constructed with a snap-on tubular cover and a tape-containing spool adapted to fit into such a cylindrical cartridge. The length of fingers 46A and 46B is selected to be about the length of a cartridge to be conveyed. All fingers are cantilevered in a forward or article-receiving direction, fingers 46A being rigidly suspended from inverted yoke 93.

Figure 3:
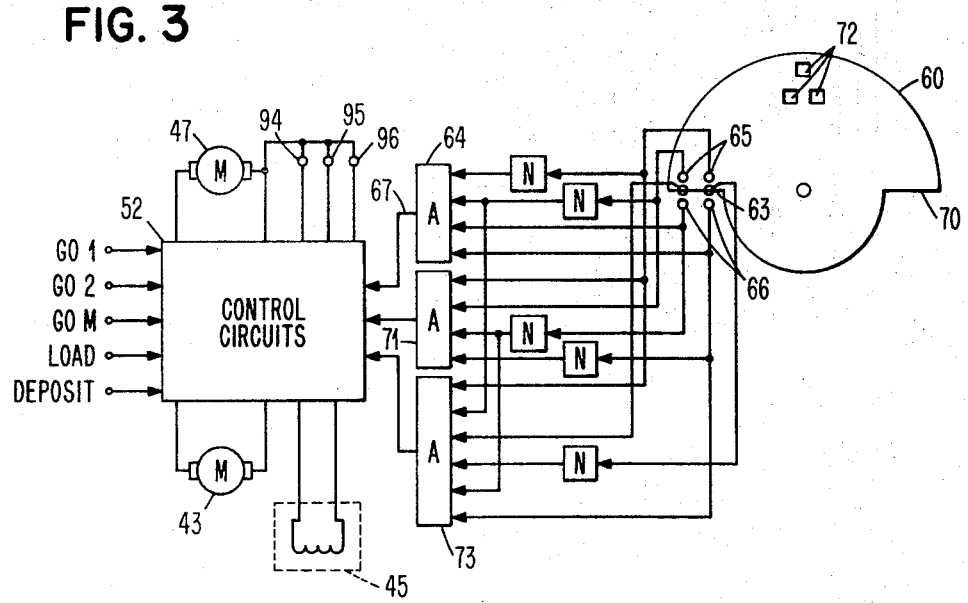
FIG. 3 is a simplified combined diagram of electrical and mechanical apparatus usable as control means for the FIGS. 2 and 4 illustrated apparatus.

The main carriage and elevator are then moved to the storage compartment or transfer port to which the article is to be lodged. Assume that it is on the opposite wall. The pivoting bed is then rotated 180° to stable position 2. When the main carriage 21 and elevator 28 are at the appropriate storage location and pivotable bed 40 is in stable position 2, reciprocating carriage 41 is again moved forwardly to the load/unload position. At the start of the forward stroke of reciprocating carriage 41, electromagnet 45 is de-energized. Upon reaching the unload position, the article is in the storage compartment or transfer port. Reciprocating carriage 41 is then returned to the travel position as shown in FIG. 3, and subsequent operations are performed.

To accommodate pivotable bed 40 being driven by pivotable bed drive motor 47 mounted on the lower side of frame 35, platform 37 has a central opening through which depending shaft 48 of bed 40 extends. Driven cable drum 49 is securely fastened to depending shaft 48. Driving cable 50 extends about cable drum 49 and is fixedly secured to pivotable bed driving capstan 51 at the upper end of drive motor 47. Control circuits 52, actuated as later described, control motor 47 to selectively move between stable positions 1 and 2 and, in certain embodiments, to intermediate stable position M. Drive motor 47 is preferably of the low-voltage DC type.

The power and signal cable extending between junction board 38 and circuit boards 40A on pivotable bed 40 include a multiturn wrap about electrical cable drum 53. On an inner radius of cable drum 53, cable 39 is folded at 90° and extends upwardly for electrical connections to circuit boards 40A. Cable drum 53 includes lower radially outwardly extending flange 54 for retaining cable 39 in the illustrated position. In stable position 1, cable 39 is relatively snuggly wrapped about drum 53. As pivotable bed 40 pivots to stable position 2, cable 39 tends to unwrap. To facilitate equal unwrap in all turns of cable 39, a mildly resilient spring 55 is secured to the inner turn of cable 39. This spring, preferably of molded plastic, urges the inner turn of cable 39 to expand radially outwardly. As tension is relieved on cable 39 as pivotable bed 40 pivots toward stable position 2, spring 55 urges the inner turns outwardly, taking up the slack that would normally occur in the outermost turn thereby keeping the outermost turn of cable 39 within the confines of radially outwardly extending flange 54.

Disposed coaxially below cable drum 53 is position indicating disk 60. Disk 60, formed as best seen in FIG. 3, moves between support plates 61 and 62 on frame 35. These plates respectively support light-emitting diodes (LED) and photosensitive transistors. The LED's are preferably focused such that their light will impinge on a single phototransistor to constitute an LED-transistor (LEDT) sensing pair. As shown in FIG. 3, six LEDT sensing pairs are employed. Stable position 1 is indicated when radial edge 63 of disk 60 is disposed intermediate the set of six LEDT sensing pairs. Logic AND circuit 64 is responsive to the LEDT pairs 65 indicating a broken light path and LEDT pairs 66 indicating a complete light path to supply a stable position 1 indicating signal over line 67 to control circuits 52. This informs control circuits 52 that pivotable bed 40 is in stable position 1. Note that the amplifiers and squaring circuits for converting LED-transistor generated currents are omitted for simplicity.

When radial edge 70 of disk 60 is disposed over the six pairs, then pairs 65 indicate a complete light path; while pairs 66 indicate a broken light path to actuate AND circuit 71. AND circuit 71 indicates stable position 2 to control circuits 52.

The intermediate position M is indicated by the three apertures 72 in disk 60 being disposed intermediate three of the six LEDT sensing pairs. AND circuit 73 responds to three of the pairs aligned with apertures 72 indicating a complete light path, with the other three pairs indicating a broken light path to indicate the intermediate position M to control circuits 52. In this regard, when intermediate position M is employed, control circuits 52 may include a servomechanism control circuit (not shown nor described) for accurately positioning pivotable bed 40 in the intermediate position. Such positioning controls are well known and are not further described for that reason. In the event a particular embodiment employs only stable positions 1 and 2, a mechanical detent or stop system (as will be described) can be employed for ensuring that pivotable bed 40 stays in the stable position until motor 47 is actuated to drive the bed to the other stable position.

Pivotable bed 40 includes detenting plate 80 which bears against spring-loaded detent follower roller 81 pivotably secured to frame 35 at 82. When detent plate outward end portion 83 is engaging detent follower roller 81, bed 40 is in stable position 1. If bed 40 tends to pivot past roller 81, the spring urging on detent follower 81 moves the pivotable bed against stop 84 thereby ensuring that bed 40 remains in stable position 1 until motor 47 is actuated to pivot bed 40 to the second stable position. The outward end portion 85 coacts with detent follower 81 in stable position 2 in the same manner as above described bearing the pivotable bed against stop 86 on platform 37. If it is desired, an axially movable stop (not shown) can be employed for intermediate position M. In this instance, whenever intermediate position M is desired, a stop on platform 37 would be raised at 89 to engage stop arm 90 on pivotable bed 40.

Circuit boards 40A on pivotable bed 40 have three pairs of LEDT's for sensing the position of reciprocating carriage 41 and sensing the fact of an article being retained on carriage 41 by electromagnet 45 and article retaining fingers 46. Boards 40A are secured to inverted yoke 93 on bed 40. Sensors 94, 95, and 96 sense the article handling status in accordance with the table below.

| EXEMPLARY ARTICLE HANDLING STATUS | | | |
|---|---|---|---|
| Status | Gap No. 96 | Forward No. 95 | Back No. 94 |
| Storage Compartment is Empty | Block | Open | Open |
| Article in Carriage | Open | Block | Block |
| Carriage is Empty | Open | (1) | (1) |
| Article Carriage is in Forward Position | Block | Open | Block |

Block means light path is broken; open means light path is completed. Note (1) indicates either or both light paths are open.

Carriage 41 has apertured boss 102 slidably secured on cylindrical rail 103 of bed 40. This arrangement accurately positions carriage 41. Additionally, carriage 41 has an outwardly opening guide groove portion 104 extending over rectangular rail 105 to complete the guiding arrangement. Electromagnet 45 is secured to the body portion of reciprocating carriage 41 in a ball-and-socket arrangement for permitting degrees of free motion for facilitating increasing tolerances in attaching to an article to be conveyed. The carriage driving cable 97 is fixedly secured to boss 102 on the underside thereof and to driving capstan 44.

The control circuits and logic circuits shown in FIG. 3 may be suitably mounted on circuit boards 40A and 40B or may be installed in main carriage 21. Bail 100 may be installed on bed 40 to prevent an article being conveyed from dropping out of the article carriage during transit. For operating in position M, bail 100 is pivotally secured to bed 40 and electromagnetically moved to a noninterfering position.

While the invention has been particularly shown and described with reference to a preferred embodiment thereof, it will be understood by those skilled in the art that various changes in form and detail may be made therein without departing from the spirit and scope of the invention.

What is claimed is:

1. Article handling apparatus adapted to selectively support an article in an article conveying device, which device having a frame portion with a centrally located platform, said platform having a first end portion for receiving an article to be conveyed and a second end portion opposite said first end portion, the improvement including in combination:

an upstanding means on each said end portion;

a carriage support rail extending between and secured on said upstanding means having an elongated travel path axis;

a reciprocating carriage movably mounted on said rail for movements between said end portions;

article holding means on said carriage for retaining an article being conveyed over said central platform when said reciprocating carriage is at said end portion;

an inverted yoke on said platform extending around said rail for permitting said carriage to move between said yoke and said platform; and first and second facing and spaced-apart resilient article nesting fingers respectively mounted on said yoke and platform and being cantilevered to extend outwardly parallel to said rail outwardly beyond said first end portion such that said article holding means moves between said article nesting fingers as said reciprocating carriage moves to and from said first end portion.

2. Apparatus as set forth in claim 1 wherein said article holding means is an electromagnet having a pair of closely radially spaced-apart annular pole faces which face toward said first end portion and having planar faces somewhat perpendicular to said travel path axis.

3. Apparatus as set forth in claim 1 wherein each said article nesting fingers has a convex outer end portion facing another of said article nesting fingers for guiding an article being received to move between said article nesting fingers.

4. Apparatus set forth in claim 1 further including in combination:

an upstanding driving capstan disposed on said central platform for rotation about an axis substantially perpendicular to said central platform;

a pulley rotatably mounted on each said upstanding means; and a flexible cable secured to said reciprocating carriage and extending over both said pulleys to said driving capstan such that reversible rotation of said driving capstan reciprocates said reciprocating carriage.

5. In an article handling apparatus having a support central platform with a reciprocating carriage movably mounted on said platform, article handling means mounted on said carriage, an upstanding yoke on said central platform disposed such that said reciprocating carriage moves thereunder toward and away from a first end portion of said central platform, the improvement comprising in combination:

first and second facing article nesting fingers respectively cantilevered to said yoke and said central platform and extending outwardly in substantially parallel spaced-apart relation toward and having a portion outwardly of said first end portion;

each said article nesting fingers having an article stopping surface portion facing toward said finger outward portions and disposed centrally of said platform;

each said article nesting finger being bifurcated from about said article stopping surface portion thereon to and including said finger outward portion; and each said article nesting finger outward portion having a convex surface portion facing another of said outward portions.

* * * * *